United States Patent [19]

Dodson

[11] Patent Number: 5,050,298

[45] Date of Patent: Sep. 24, 1991

[54] METHOD OF MANUFACTURING A MECHANICALLY-BONDED, MONOLITHIC SEALING RING FOR STUFFING BOX INCLUDING AXIALLY CENTRAL PORTION MADE OF COMPRESSED FLEXIBLE FOAMED GRAPHITE TAPE

[75] Inventor: Andy R. Dodson, Columbiana, Ala.

[73] Assignee: Sealing Equipment Products Co., Pelham, Ala.

[21] Appl. No.: 536,755

[22] Filed: Jun. 12, 1990

Related U.S. Application Data

[62] Division of Ser. No. 248,163, Sep. 23, 1988.

[51] Int. Cl.[5] .............................................. F16J 15/12
[52] U.S. Cl. ................................. 29/888.3; 29/419.1; 29/511; 277/204; 277/1
[58] Field of Search ................... 29/888.3, 419.1, 511; 277/229, 230, 204, 227, 112, 235 R, 188 A, 188 R

[56] References Cited

U.S. PATENT DOCUMENTS

| | | | |
|---|---|---|---|
| 2,468,797 | 5/1949 | Wang | 29/888.3 |
| 4,219,204 | 8/1980 | Pippert | 277/188 A |
| 4,256,317 | 3/1981 | Havens et al. | 277/112 |
| 4,327,923 | 5/1982 | Chesterton et al. | 277/124 |
| 4,417,733 | 11/1983 | Usher | 277/1 |
| 4,428,592 | 1/1984 | Shaffers | 277/230 |
| 4,455,334 | 6/1984 | Ogino et al. | 277/235 B |
| 4,463,959 | 8/1984 | Usher et al. | 277/230 |
| 4,601,476 | 7/1986 | Usher et al. | 277/230 |
| 4,789,323 | 12/1988 | Hudson | 29/888.3 |

Primary Examiner—Irene Cuda
Attorney, Agent, or Firm—Cushman, Darby & Cushman

[57] ABSTRACT

A mechanically-bonded, monolithic sealing ring is provided for a stuffing box of a high temperature, high pressure valve or pump. In this ring, the components are pre-united by axially squeezing together originally separate center and end rings in a die assembly of a hydraulic press. By preference, the two axially extreme portions of the monolithic ring are made of braided graphite and the axially central portion of the monolithic ring is made from spirally-wrapped foamed flexible graphite tape which, in the course of die-foaming the monolithic ring, is axially compressed thereby densifying it and mechanically bonding it with the end rings. The monolithic ring is easily installed in a stuffing box in one piece.

6 Claims, 4 Drawing Sheets

METHOD OF MANUFACTURING A MECHANICALLY-BONDED, MONOLITHIC SEALING RING FOR STUFFING BOX INCLUDING AXIALLY CENTRAL PORTION MADE OF COMPRESSED FLEXIBLE FOAMED GRAPHITE TAPE

This is a division of application Ser. No. 07/248,163, filed Sept. 23, 1988.

BACKGROUND OF THE INVENTION

A popular conventional type of packing for the stuffing boxes of high pressure, high temperature valves and pumps includes several pieces which are separately made and installed in the stuffing box. Such a construction may, for instance, include one or more axially-central rings made of compressed flexible foamed graphite tape, sandwiched between end rings which prevent extrusion of the graphite around the packing gland or along the stem and out of the stuffing box.

The usual instructions which come with a high temperature, high pressure valve or pump conventionally call for use of a multi-ring stem packing assembly, based on the manufacturer's knowledge of what kinds of packing are available, the problems likely to be encountered in use, and the normal installation procedures with which installation and service personnel can be expected to be familiar.

It is widely thought that high pressure high temperature valves require multiple-ring stuffing box assemblies to provide adequate seals. Braided packing rings, which are widely used, have joints and so two or more of them are usually stacked, with their joints angularly offset in order to eliminate leak paths. Endless rings made of compressed flexible graphite tape, although they are circumferentially continuous, are generally provided as a sandwich construction including one or a plurality of graphite rings sandwiched between anti-extrusion end rings.

In practicing a conventional installation procedure, a bottom braided end ring is installed in the stuffing box and seated. Next, one or more compressed flexible graphite rings are installed (with their radial joints angularly staggered, if they are split rings). Next, the top braided end ring is installed and seated.

Finally, a gland follower is installed and the gland or bonnet is tightened according to specification.

SUMMARY OF THE INVENTION

A mechanically-bonded, monolithic sealing ring is provided for a stuffing box of a high temperature, high pressure valve or pump. In this ring, the components are pre-united by axially squeezing together originally separate center and end rings in a die assembly of a hydraulic press. By preference, the two axially extreme portions of the monolithic ring are made of braided graphite and the axially central portion of the monolithic ring is made from spirally-wrapped foamed flexible graphite tape which, in the course of die-forming the monolithic ring, is axially compressed thereby densifying it and mechanically bonding it with the end rings. The monolithic ring is easily installed in a stuffing box in one piece.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Figure 7:
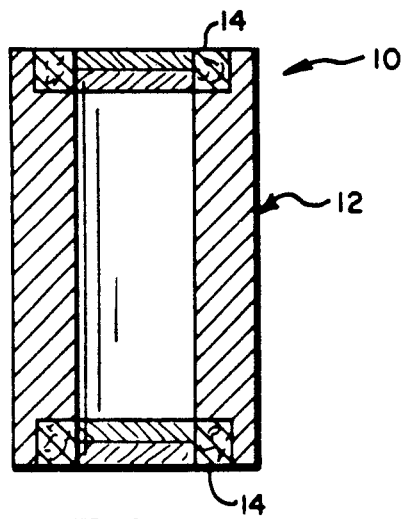
FIG. 7 is a view similar to FIG. 5, showing a subsequent stage, in which the intermediate assembly has been compressed to a further degree for mechanically bonding the rings of braided material to the compressed graphite, thereby creating a mechanically-bonded monolithic sealing ring for a stuffing box.
Figure 8:
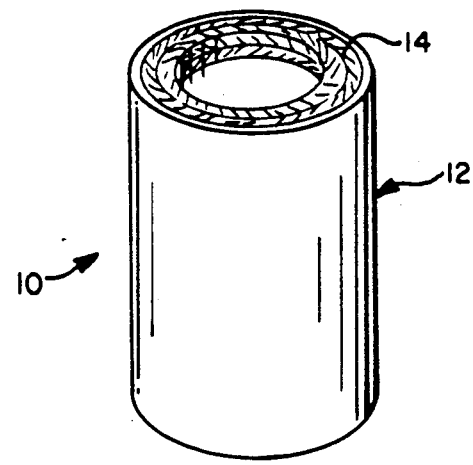
FIG. 8 is a perspective view of the monolithic packing cartridge of FIG. 8.

Looking briefly at FIGS. 7 and 8, it is an object of the invention to provide a monolithic (unitary), mechanically-bonded sealing ring, especially for use as a one-piece (cartridge-type) packing annulus 10 for a stuffing box, including an axially central portion 12 made of compressed flexible foamed graphite tape, and two opposite end portions 14, preferably made of braided graphitic or carbon packing.

Figure 1:
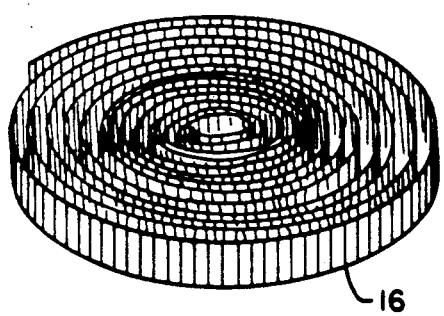
FIG. 1 is a perspective view showing a roll of conventional Grafoil® flexible foamed graphite tape which may be used in making a corresponding portion of the monolithic sealing ring of the present invention.
Figure 2:
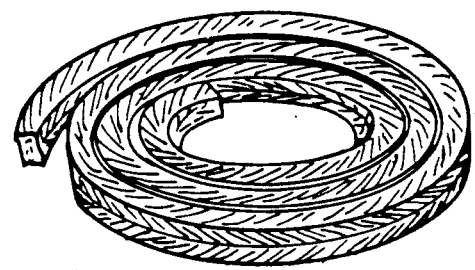
FIG. 2 is a perspective view of a length of conventional braided material which may be used in making corresponding portions of the monolithic sealing ring of the present invention.

FIGS. 1 and 2 depict conventional materials which may be used in accordance with the principles of the present invention for making the article depicted in FIGS. 7 and 8.

FIG. 1 shows a coil 16 of commercially available Graphoil® foamed flexible graphite tape. This material which is commercially available from Union Carbide Corporation is preferably used in its commercially available transversally corrugated form. This material and a method for making it are described in U.S. Pat. No. 3,404,061, issued Oct. 1, 1968. This material has the approximate appearance and flexibility of a fairly thick, shiny gray grosgrain hair ribbon, although it is more ductile and so tends to remain more fully coiled than does a hair ribbon when let go of after being coiled. The U.S. patent of Schnitzler, U.S. Pat. No. 4,068,853, issued Jan. 17, 1978 gives the following characteristics for the material: densities of less than 5 to about 137 pounds per cubic foot are readily obtained, and widths of one-quarter inch to one inch and 0.005 inches to 0.020 inches thick can be readily prepared. A currently available brochure or product information sheet from Union Carbide Corporation further describes the material as to composition and physical characteristics of available foamed flexible graphite tape, as follows: sheets and rolls produced from naturally occurring graphite with no binders or resins with a density of 70 pounds per cubic foot. Maximum ash content 5%. Minimum carbon content 95.0%.

A foamed flexible graphite tape used in a preferred practice of the present invention is designated by the Union Carbide product number GTB and has the following composition and physical characteristics: flexible graphite, 5% maximum ash content, 95% minimum carbon content.

However, foamed flexible graphite tape used in practicing the present invention could have compositions and physical characteristics within the following ranges: less than or more than 70 pound per cubic foot, minimum ash content of 0.5%, maximum carbon content of 99.5%.

FIG. 2 shows a length 18 of conventional braided graphitic end ring material useful for making the end portions 14. This material is commercially available from Polycarbon, and from Sealing Equipment Products Company. This material has the appearance and approximate flexibility of a fairly thin, matte gray sash cord or clothesline rope although it may be more open (less tightly braided).

According to a currently available brochure or product information sheet, this braided stock material, in the size, weight and composition preferably used, has the following product number, composition and characteristics: SEPCO ML4500 braided graphitic yarn with a carbon content of 99%.

However, anti-extrusion end material used in practicing the present invention could have compositions and physical characteristics within the following ranges: Carbon molecular structure with a carbon content of more than or less than 65%. Braided fiberglass or any braided material or a molded or compressed composite with or without a binder to hold its form or shape.

Figure 3:
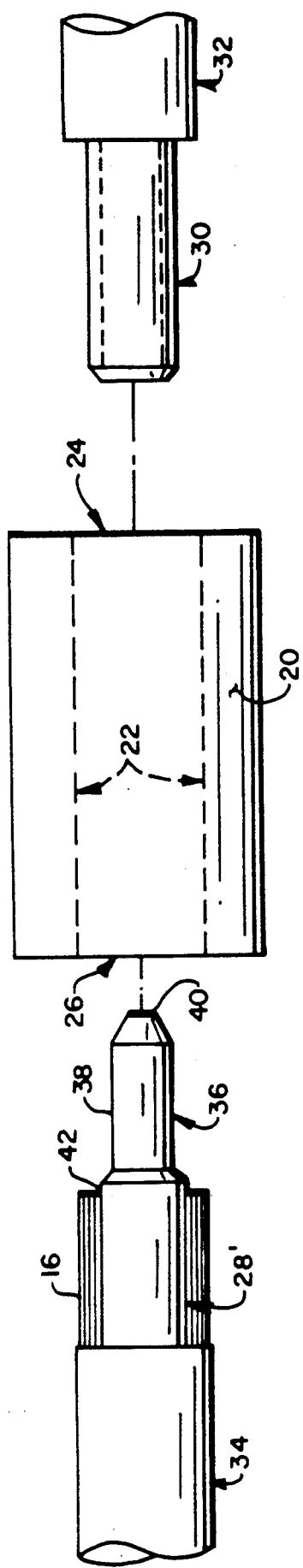
FIG. 3 is a longitudinal sectional view showing an initial forming step in which one sealing ring-worth of coiled tape is inserted into a forming die.

Referring to FIG. 3, in practicing the invention, a forming die 20 is provided so as to have a right circular cylindrically-curved, radially inwardly facing, smooth sidewall 22 of constant diameter and two axially opposite ends 24, 26. By preference, both ends 24, 26 are open, and arranged to be telescopically entered by the punches 28, 30 of respective rams 32, 34, preferably of a conventional hydraulic press with the die, rams and punches conventionally mounted and the press operated in accordance with its manufacturer's conventional instructions. Although a press with one forming die could be used, a press with two or several dies disposed in an array could be used.

One suitable hydraulic press is the model D12-5M press made by Neff Press, which has the following characteristics: hydraulic pressure is applied to punches to a set amount or a specific distance and reversed to up position to remove finished part.

In a typical practice of the invention, the object is to produce a monolithic packing annulus having an outer diameter of any size, an inner diameter of any size less than the O.D. and a length of any size.

There are a number of different ways that the punches and die could be configured and operated to produce substantially the same product. For instance, the two punches could be identical in size and shape but have mirror image orientation, a length of the flexible graphite tape 16 could be cut from the coil, coiled up, inserted into the die, and the two punches run into the die from opposite ends. Or, the mandrel portion of one of the punches could be made longer and the mandrel portion on the other punch made correspondingly shorter (to the extreme of being omitted entirely), and, in any event, the coiled increment of flexible graphite tape 16 could be wrapped onto one of the mandrels (e.g. the longer one, if one is longer), and carried into the mold in that manner.

The current preferred structure for the punches, and the reasons for that preference are as shown in FIG. 3. A mandrel in one punch and a throughbore in the opposite punch to receive the mandrel work better to align, and give longer die life.

Regardless of how the required punch shape is split between the two punches 28, 30, the punches include surfaces having shapes and orientations to provide the forming functions described below. Punch 28 is shown having a leading, mandrel portion 36 which is right circular cylindrical in transverse cross-sectional shape, having a sidewall 38 and a flat, leading end wall 40. The mandrel portion 36 is based on a larger diameter body portion 42 having a right circular cylindrical transverse cross-sectional shape. The punch bodies may further include larger diameter guide surfaces for engagement with corresponding surfaces on the die in order to axially centralize the punches with die as the punches telescope into the die.

In the example being given, the diameter of the mandrel 36, punch 28, is 0.500", the length of the mandrel 36 on punch 28 is 2.285 and the length of punch 30 is 4.225. Each punch body portion 42 has a diameter of 0.860 and a length of 4.225. The annular shoulder 44 between each mandrel sidewall and punch body is flat.

Figure 4:
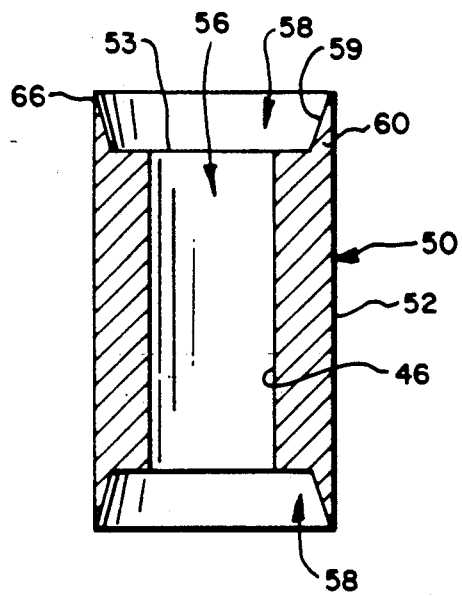
FIG. 4 is a similar view showing a subsequent stage, in which the coiled tape has been compressed to an intermediate degree, for forming a unitary annular body having annular recesses coaxially formed in its axially opposite ends.
Figure 4A:
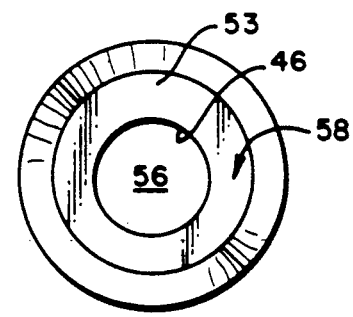
FIG. 4a is an end view of the intermediate article depicted in FIG. 4.

The object in carrying out the forming steps which are shown in FIGS. 3 and 4 is to insert one monolithic ring's worth of flexible foamed graphite tape into the die, and to telescope the punches into opposite ends of the die so as to confront axially opposite ends of the increment of tape and compress the tape widthwise of the tape, while internally supporting the coiled increment and impressing the opposite ends of the coil, causing plastic deformation which molds, shapes and densifies the increment into a unitary, consolidated intermediate annular article 50 which has a right circular cylindrically curved outer peripheral sidewall 52, typically 0.821 inches in diameter a right circular cylindrically curved inner peripheral sidewall 46, disposed coaxially with the outer wall 52 and defining a longitudinal bore 56, and coaxially-located annular recesses 58 in the axially opposite ends, each having a flat end wall 53 0.75 in diameter and a frustoconical inner side wall 59. Typically, the depth of each recess 58 is 0.210 inches and the thickness of each tubular flange 60 defined between the respective recess 58 and the outer wall 52 is 0.032".

As an indication of the amount of compression which takes place, the initial width of the tape 16 typically is twice the thickness of the finished cartridge, and the initial density of the tape typically is 70 pounds per cubic foot. Upon completion of the step shown in FIG. 4, the dimensions of the intermediate article 50 typically lies in the range 70-140 pounds per cubic foot and is preferably about 100 pounds per cubic foot.

The amount of pressure applied to the increment of tape by the punches in the compression step illustrated in FIG. 4 is limited by controlling the hydraulic pressure acting on the rams on which the punches are mounted. At the maximum extension of the rams, the relationship of the ends of the mandrels 36 to one another typically is that 36 enters into punch 30 throughbore.

Figure 5:
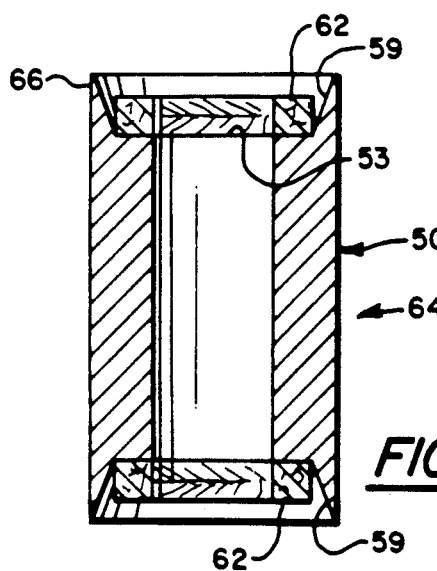
FIG. 5 is a view similar to FIG. 4, showing a subsequent stage, in which lengths of braided material have been inserted in the respective end recesses as split rings.
Figure 5A:
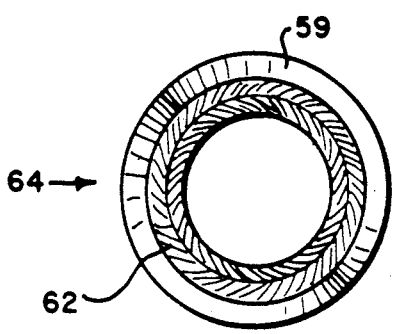
FIG. 5a is an end view of the assembly depicted in FIG. 5.
Figure 6:
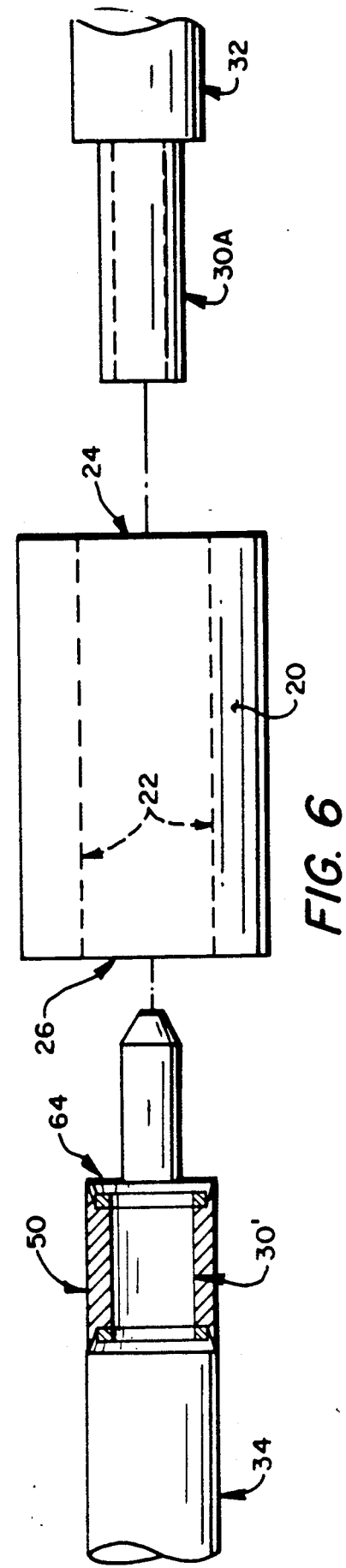
FIG. 6 is a longitudinal sectional view showing a futher forming step in which the intermediate assembly of FIG. 5 is inserted into a forming die.

In the next step, described with relation to FIGS. 5, 5a and 6, the punches 28, 30 (see FIGS. 3a and 3b) are telescopically withdrawn (both at once or one at a time, the both at once being preferred), and increments of the braided material 18, cut and curled into rings 62 having outer diameters approximately equal to the inner diameters of the end flanges 60 are telescopically inserted into the respective recesses 58, one per recess. By preference, these end rings are inserted by automatic feeders, but can easily be inserted by hand. When in place, and prior to any further compression being carried out, the thickness of a ring 62, measured axially of the intermediate article is typically 0.125 inches, compared with the typical depth of 0.125 for the respective recess.

In the next stage, which is depicted in FIG. 6, a set of hydraulic ram punches 28, 30 (or 28', 30', if different from the rams 28, 30) are telescopically run into the die 20 against opposite ends of the assembly 64 constituted by the intermediate article 50 with rings 62 of the braided material nested in its opposite end recesses 58. If, in the preferred embodiment, the punches 28, 30 are not the same as (nor identical to) the punches which have been described hereinabove in relation to FIG. 4, the differences are as shown in FIG. 6. Flat ends are used in the final compression to crimp the recesses 58 over the end rings 62. At this time, the assembly is further axially compressed by the opposed punches 28, 30, so that the free end portions 66 of the flanges 60 crimp around the axially outer ends of the braided rings 62 somewhat, giving the thus-formed monolithic mechanically-bonded sealing ring 10 (FIGS. 7 and 8), in the example under discussion, an overall length of 1.125". In this example, the density of the central portion 12 is preferably about 100 pounds per cubic foot and lies in the range of 85 pounds per cubic foot to 120 pounds per cubic foot.

Conventional techniques are used for removing the sealing ring 10 from the die 20 shown in FIG. 6 in order to obtain the product shown by itself in FIGS. 7 and 8. For instance, after the complete compression stage, either punch 28 or 30 can be pushed completely through the die 20 to remove the finished part.

Figure 9:
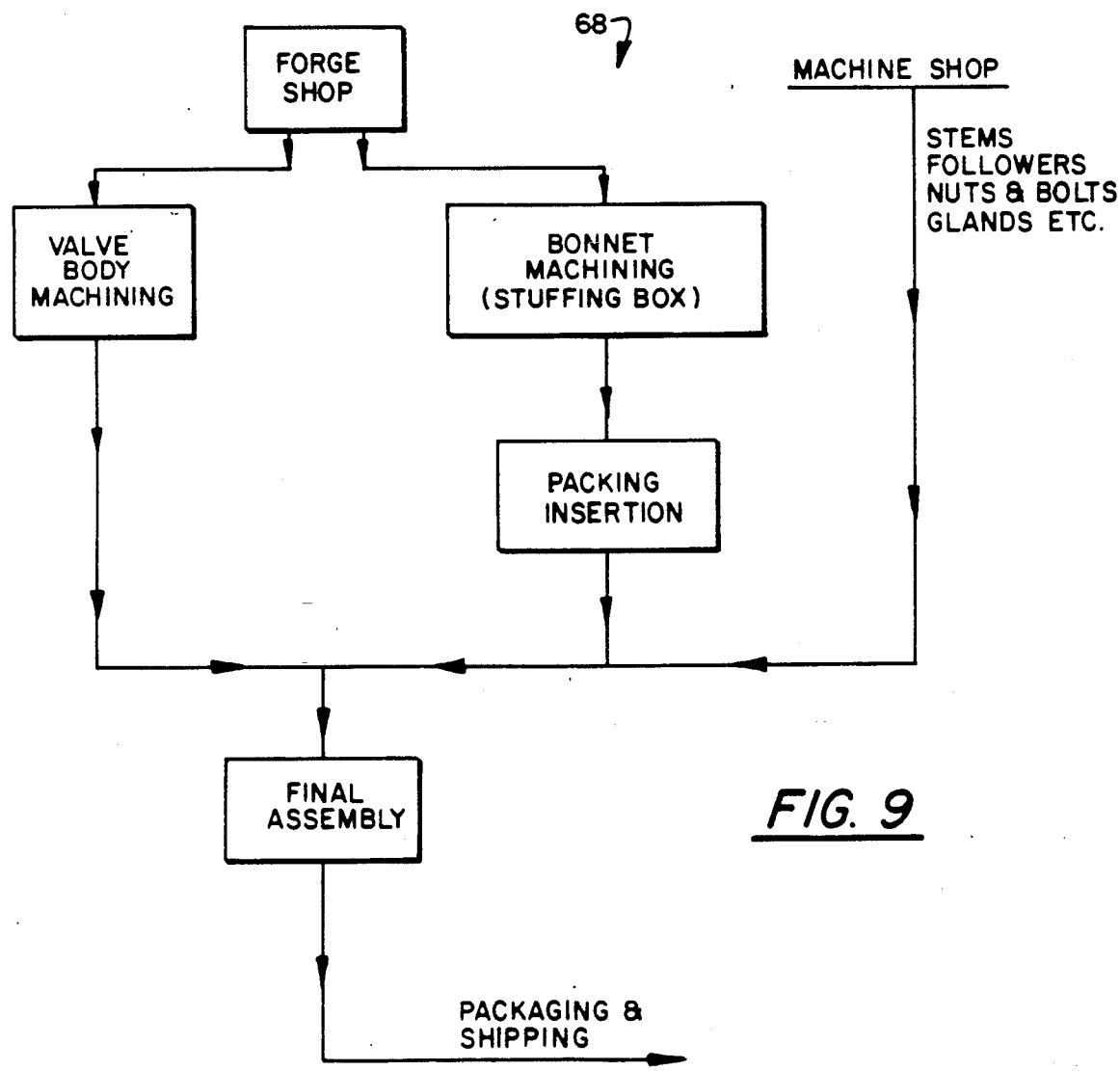
FIG. 9 is a schematic view of a valve assembly line on which the monolithic packing cartridges of FIG. 7 are inserted in the valve stem stuffing boxes of valves at a packing insertion station.

Although the product of the invention is believed to have important uses in the after market, i.e. for replacing packing in valves and pumps which are already in service or which have been removed from service for refurbishment, a particularly attractive use for the product 10 is in connection with the original manufacture and assembly of new valves or pumps. In this connection, a valve assembly line 68 is shown very schematically in FIG. 9 (not all steps in the manufacture are depicted). On the valve assembly line 68, as each valve V in succession reaches a packing annulus installation station, the valve stem packing is manually or hand loaded. This usually consists of 5 to 12 individual packing rings. Each ring is placed in one at a time by hand.

Figure 10:
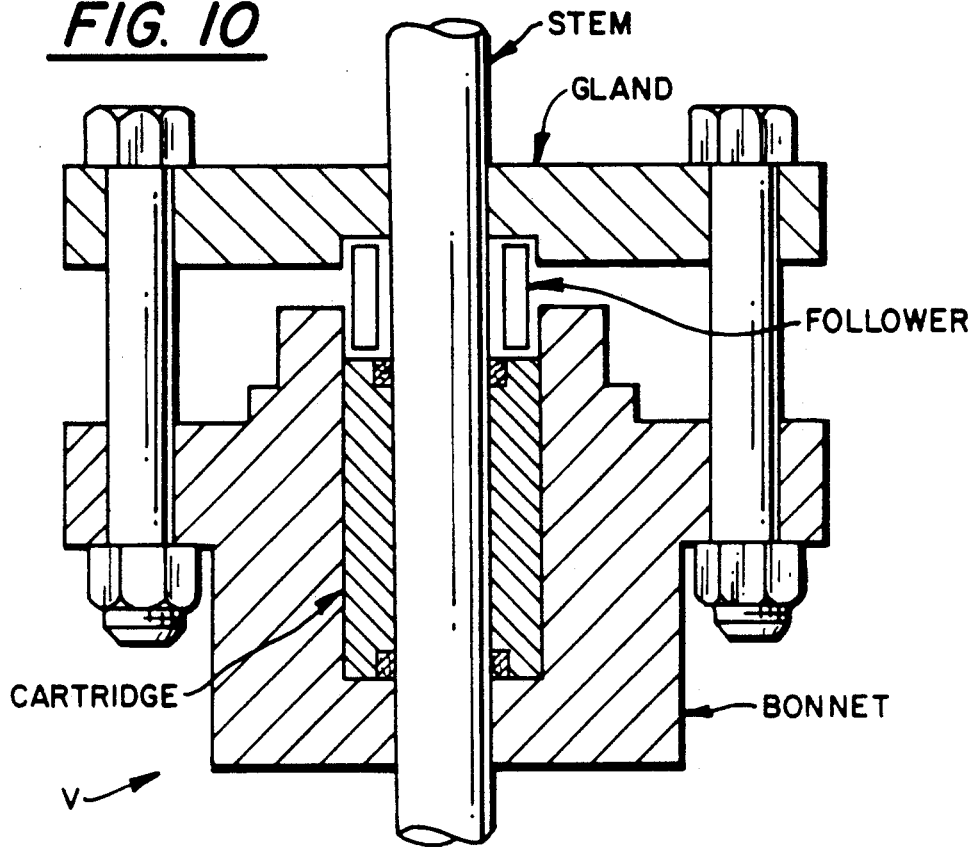
FIG. 10 is a fragmentary longitudinal sectional view of a high pressure-high temperature valve having a stuffing box provided with a monolithic sealing ring according to the present invention.
Figure 11:
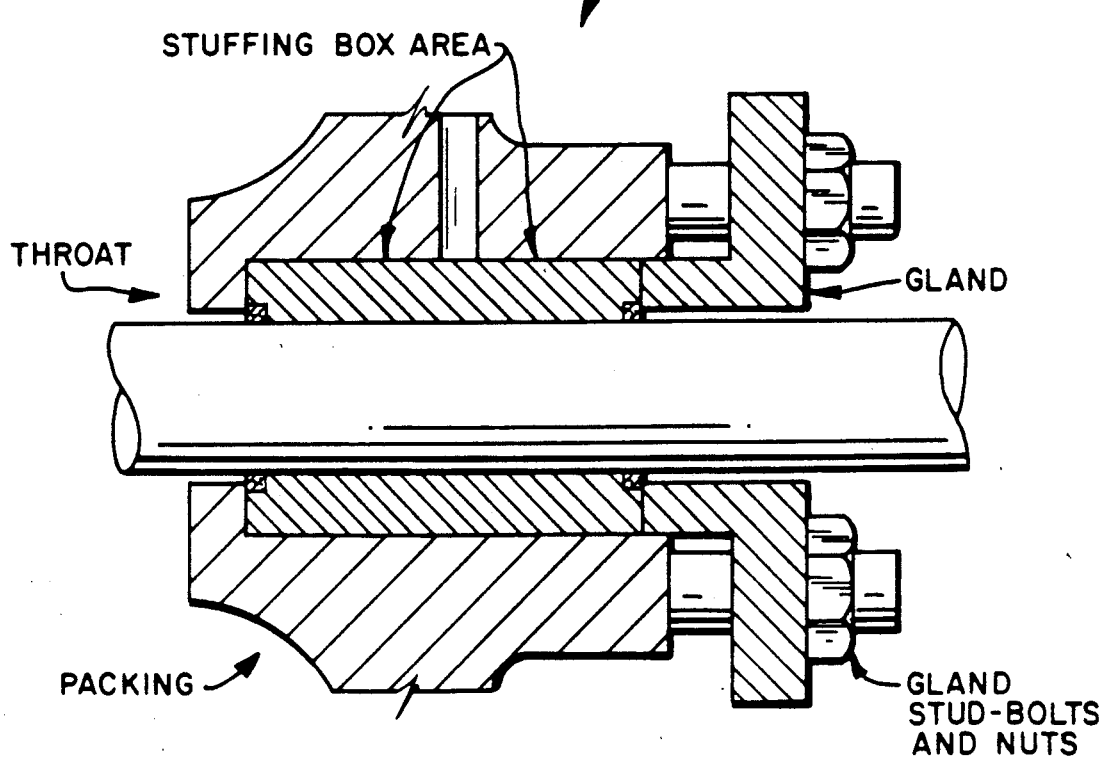
FIG. 11 is a fragmentary longitudinal sectional view of a pump having a stuffing box provided with a monolithic sealing ring according to the present invention.

In FIG. 10 the bonnet portion 70 of a valve V provided with a one-piece stuffing box sealing ring in accordance with principles of the present invention is illustrated. The internal diameter of the stuffing box at the location of the monolithic sealing ring 10 in the example given herein is 0.880 inches and the axial length of the space in which the monolithic sealing ring 10 is located, upon tightening of the packing gland 72 is 1.165 inches. Similarly, a respective portion of a pump P provided with a monolithic sealing ring according to the present invention is shown in FIG. 11.

One might think that the fact that the flanges 60 are provided and thus have a certain thickness which lies outside the outer diameter of the end ring portions 14 would tend to permit the graphite material of the central portion 12 to extrude beyond the end portions 14 (or beyond one of them) and out of the stuffing box. However, this does not occur in practice, because there is no clearance or gap as it is on the inside diameter nor is there any moving parts around the outer diameter to create an extrusion problem.

Although the process for producing the articles 10 can be conducted to make one article 10 at a time, it is preferable in practice to provide a table (not shown), containing a plurality of dies 20 arranged in a circle, with a respective plurality of pairs of punches disposed to enter and retract from the respective dies. In such a case, between conducting each step either the table or the sets of dies are rotated by one increment. Rotation of the table is preferred. Such rotary presses are commercially available and well known. For instance, a model D12 rotary press made by Neff Press Company would be suitable.

It should now be apparent that the mechanically-bonded, monolithic sealing ring for stuffing box including axially central portion made of compressed flexible foamed graphite tape as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for producing a mechanically-bonded, monolithic sealing ring for a stuffing box of a high pressure, high temperature valve or pump, said method comprising:
   convolutely spiral-winding onto a cylindrical mandrel a length of foamed flexible graphite tape;
   inserting the thusly tape-wrapped mandrel into a die having a cylindrical inner peripheral wall;
   coaxially engaging the wrapping of tape from two axially opposite ends with respective annular punches and thereby axially compressing the wrapping of tape to a first, intermediate extent, to form a unitary, consolidated intermediate annular article having an axial throughbore and two axially opposite ends provided with respective annular, axially outwardly opening recesses which are contiguous with said axial throughbore and integrally surrounded by respective annular collars of said compressed foamed flexible graphite tape;

removing said engagement by said punches;

coaxially depositing an anti-extrusion end ring into each of said recesses, thereby providing an intermediate assembly;

while supporting said intermediate assembly on a cylindrical mandrel in a die having a cylindrical inner peripheral surface, coaxially engaging said intermediate assembly from two axially opposite ends with respective annular punches and thereby: axially compressing said intermediate assembly, crimping respective of said annular collars against respective of said end rings, mechanically uniting said end rings with said intermediate annular article, further compressing said intermediate annular article into a central portion of said sealing ring, and causing said central portion of said sealing ring to become axially outwardly coterminous, on said annular collars thereof, with respective of said end rings; and removing said sealing ring from engagement by said mandrel, said die and said punches.

2. The method of claim 1, wherein:

said recesses are formed so as to have respective annular axially outwardly flaring radially inner peripheral sidewalls.

3. The method of claim 1, wherein:

said end rings are made of braided graphitic material.

4. The method of claim 1, wherein:

said end rings are made of carbon.

5. The method of claim 1, wherein:

said central portion has a density of 85–120 pounds per cubic feet.

6. The method of claim 1, wherein:

said central portion has a density of about 120 pounds per cubic foot.

* * * * *